United States Patent
Sasagawa

(10) Patent No.: US 6,681,245 B1
(45) Date of Patent: Jan. 20, 2004

(54) DISPLAY OF DETECTED EVENT FOR INFORMATION HANDLING SYSTEM

(75) Inventor: Shigekazu Sasagawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/344,328

(22) Filed: Jun. 24, 1999

Related U.S. Application Data

(62) Division of application No. 08/545,202, filed on Oct. 19, 1995.

(30) Foreign Application Priority Data

Apr. 19, 1995 (JP) .............................. 7-117983
Apr. 20, 1995 (JP) .............................. 7-119172

(51) Int. Cl.$^7$ .......................................... G06F 13/00
(52) U.S. Cl. .................... 709/206; 709/318; 709/203; 709/204; 709/224; 709/314; 709/315
(58) Field of Search .............................. 709/100, 200, 709/220, 221, 222, 224, 201, 203, 206, 225, 237, 235, 313, 315, 318, 320

(56) References Cited

U.S. PATENT DOCUMENTS

| | | | |
|---|---|---|---|
| 4,896,290 A | 1/1990 | Rhodes et al. ............... | 710/67 |
| 4,965,772 A | * 10/1990 | Daniel et al. ............... | 709/224 |
| 5,063,523 A | 11/1991 | Vrenjak ..................... | 709/223 |
| 5,155,842 A | 10/1992 | Rubin ........................ | 714/22 |
| 5,355,484 A | 10/1994 | Record et al. ............... | 717/127 |
| 5,634,039 A | 5/1997 | Simon et al. ............... | 424/9.32 |

FOREIGN PATENT DOCUMENTS

| | | |
|---|---|---|
| EP | 0 295 379 | 12/1988 |
| JP | 5-73274 | 3/1993 |
| JP | 5-94337 | 4/1993 |

OTHER PUBLICATIONS

W.W. Arkeketa, J.R. Clark, G.E. Fisher, R.W. Liang and J.A. Perry, "Graphical User Interface for LAN NetView Fix—Event Log Filter Notebook," IBM Technical Disclosure Bulletin, vol. 37, No. 04B, Apr. 1994, pp. 423–425.

"Method to Allow LAN NetView Fix Users to Identify Important Events," IBM Technical Disclosure Bulletin, vol. 37, No. 04B, Apr. 1994, pp. 7–8.

* cited by examiner

*Primary Examiner*—Majid Banankhah
(74) *Attorney, Agent, or Firm*—Finnegan, Henderson, Farabow, Garrett, & Dunner LLP

(57) ABSTRACT

A basic message is derived from a message database file based on an identifier indicative of the sort of an event contained in event data under control of an event message forming program. A message component specific to the event contained in the event data is derived under control of an event data acquiring procedure. The event message forming program inserts the message component into the basic message to thereby complete a desired message. When the basic messages and the event data acquiring procedures are prepared in correspondence with the new sorts of events, these new sorts of events can be simply accepted in the conventional main structure.

5 Claims, 13 Drawing Sheets

FIG. 4

NORMAL EVENT

| Date / Time | Occurrence Source | Event |
|---|---|---|
| 95/03/16 23:26:07 | Job (ts.ps,{HAMMER,4194 | State was changed. (Status after change:processing |
| 95/03/16 23:26:07 | Printer (kikuhime) | State was changed. (Status after change:printing) |
| 95/03/16 23:26:05 | Job (ts.ps,{HAMMER,4194 | State was changed. (Status after change:pending |
| 95/03/16 23:24:39 | Printer (kikuhime) | Unrecoverable failure occurred in printer.System |
| 95/03/16 23:23:12 | Job (ts.ps,{HAMMER,4194 | State was changed. (Status after change:pending |
| 95/03/16 23:23:11 | User op. (Print) | Operation was completed. |
| 95/03/16 23:23:11 | Job (ts.ps,{HAMMER,4194 | Destination printer was allocated. (Printer name: kik |
| 95/03/16 23:23:11 | User op. (List Object Attr | Operation was completed. |
| 95/03/16 23:23:11 | User op. (List Object Attr | Operation was completed. |
| 95/03/16 23:23:10 | Job (ts.ps,{HAMMER,4194 | State was changed. (Status after change:preprocess |
| 95/03/16 23:23:09 | Job (ts.ps,{HAMMER,4194 | Spooled. (Owner of job:SASAGAWA) |
| 95/03/16 23:23:09 | User op. (List Object Attr | Operation was completed. |

FIG. 6

```
{  id_val_event_je_attention_feeder_empty,
   id_val_event_severity_error,
   id_val_event_category_je,
   "Paper of ※ was depleted."
},
{  id_val_event_je_attention_add_paper,
   id_val_event_severity_error,
   id_val_event_category_je,
   "Supplement paper having size of ※ to ※."
},
{  id_val_event_je_attention_system_error,
   id_val_event_severity_error,
   id_val_event_category_je,
   "System error occurred."
},
{  id_val_event_je_attention_no_feeder_tray,
   id_val_event_severity_error,
   id_val_event_category_je,
   "No ※ is set."
},
{  id_val_event_je_warning_toner_low,
   id_val_event_severity_warning,
   id_val_event_category_je,
   "Replace toner cartridge by new one due to toner  cartridge
    replacement term."
},
{  id_val_event_je_warning_drum,
   id_val_event_severity_warning,
   id_val_event_category_je,
   "Replace drum by new one due to drum replacement term."
},
{  id_val_event_je_message_output_bin_changed,
   id_val_event_severity_report,
   id_val_event_category_je,
   "Eject destination was changed into ※."
},
```

FIG. 9

NOTIFICATION OF INTEREST EVENT

Following Interest Events Occurred.

| Time | Code | Occurrence Source | Message |
|---|---|---|---|
| 03/16 23:21 | P0072 | Server | It exceeds using limit of account file. |
| 03/16 23:22 | P0058 | Job (ts.ps,{NAMMER,419 | Start instruction waiting job(ts.ps)was accepted. |
| 03/16 23:23 | P0057 | Job (ts.ps,{HAMMER,419 | Destination printer was allocated.(Printer name: kikuhime) |
| 03/16 23:24 | P0002 | Printer(kikuhime) | Unrecoverable failure occurred in printer. |
| 03/16 23:26 | P0072 | Server | It exceeds using limit of account file. |
| 03/16 23:26 | P0058 | Job (ts.ps,{HAMMER,419 | Start instruction waiting job(ts.ps)was accepted. |

Register(R)   All Cancel(A)   Close(C)

FIG. 12

```
{ id_val_event_je_attention_feeder_empty,
  "Paper of %S was depleted."
  1,
  {PS_GetMsg_JE_FeederIdentifier}
},
{ id_val_event_je_attention_add_paper,
  "Supplement paper having size of %S to %S."
  3,
  {PS_GetMsg_JE_FeederIdentifier,PS_GetMsg_JE_MediumIdentifier,
PS_GetMsg_JE_Media Edge Feed}
},
{ id_val_event_je_attention_system_error,
  "System error occurred."
  0,
  NULL
},
{ id_val_event_je_attention_no_feeder_tray,
  "No %S is set."
  1,
  {PS_GetMsg_JE_FeederIdentifier}
},
{ id_val_event_je_warning_toner_low,
  "Replace toner cartridge by new one due to toner cartridge
  replacement term."
  0,
  NULL
},
{ id_val_event_je_warning_drum,
  "Replace drum by new one due to drum replacement term."
  0,
  NULL
},
{ id_val_event_je_message_output_bin_changed,
  "Eject destination was changed into %S."
  1,
  {PS_GetMsg_JE_OutputbinIdentifier}
},
```

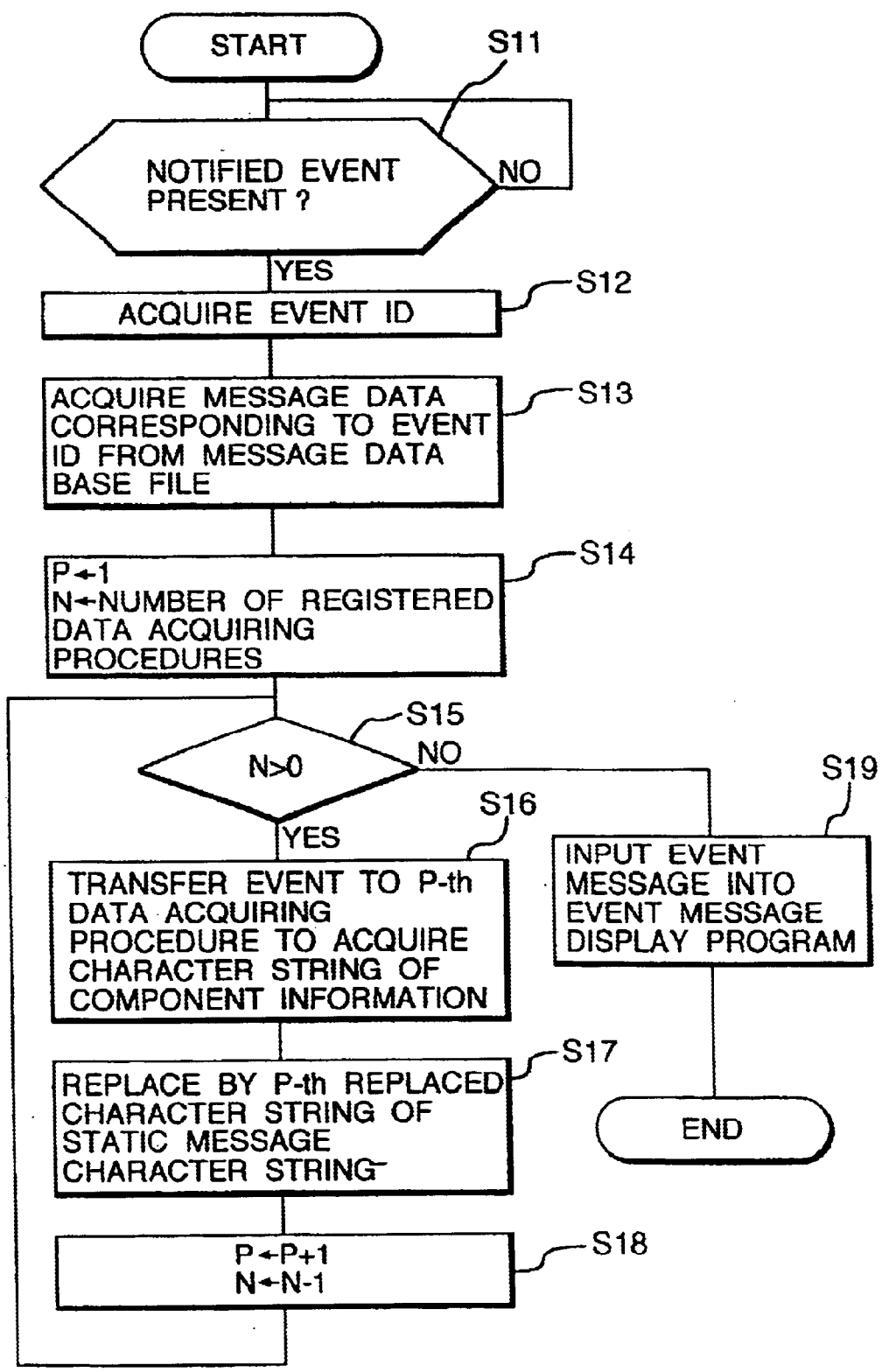

DISPLAY OF DETECTED EVENT FOR INFORMATION HANDLING SYSTEM

This is a division of application Ser. No. 08/545,202, filed Oct. 19, 1995, which is incorporated herein by reference.

BACKGROUND OF THE INVENTION

1. Field of the Invention

The present invention generally relates to an information processing apparatus. More specifically, the present invention is directed to an event monitoring display capable of not only displaying an event, but also selecting such an event desirably being displayed by a user, and furthermore to a method capable of effectively producing a message for a display of an event.

2. Discussion of the Related Art

In Japanese Patent Unexamined Publication No. Hei. 5-73274, there is disclosed such a system that a plurality of computer systems are monitored by way of a single console. In this disclosed system, the failure messages previously registered in the console are compared with various messages transmitted from the respective computer systems. When the failure message is made coincident with the transmitted message, it is judged that the failure has occurred, which will then be displayed on the multi-window screen of the console. However, this conventional information processing system could not realize that a user selects his desirable event and the desirable event is displayed in an easily understandable manner.

On the other hand, Japanese Patent Unexamined Publication No. Hei. 5-94337 discloses a method for outputting the failure recorded data. When the failure recorded data is displayed to the user, the individual report forming functions are employed so as to correspond to the identifiers representative of the sorts of the failure data, and then the different output formats from each other, depending upon the failure data, can be employed. However, in this conventional failure recorded data outputting method, even when there are similar output formats, if these output formats contain only one different event, then another report forming function is necessarily required, resulting in a complex structure.

SUMMARY OF THE INVENTION

The present invention has been made in an attempt to solve the above-described problems, and therefore has a primary object to provide an information processing apparatus capable of freely selecting a display message by a user.

Also, the present invention owns a secondary object to provide a message forming method capable of forming various messages in correspondence with events in wide range in a very simple arrangement, and furthermore capable of simply producing the corresponding messages, while flexibly responding to newly produced events later.

According to a first aspect of the present invention, there is provided an information processing apparatus including a plurality of resources containing a display apparatus and for detecting an event occurred in the resources to display the detected event on the display apparatus, comprising: candidate event information storing means for storing therein information related to a candidate event which may occur in the resources; detecting means, provided with the resources, for detecting an event occurred in the resources; candidate event display controlling means for displaying the candidate event on the display apparatus; candidate event selecting means for selecting the candidate event displayed by the candidate event display controlling means; selected event information storing means for storing therein information related to the event selected by the candidate event selecting means; judging means for judging as to whether or not the detected event corresponds to the event selected by the candidate event selecting means based on the information stored in the selected event information storing means; and detected/selected event display controlling means for displaying the detected event on the display apparatus based upon a judgment result by the judging means when the event detected by the detecting means corresponds to the event selected by the candidate event selecting means.

According to a second aspect of the present invention, there is provided an information processing apparatus including a plurality of resources containing a display apparatus and for detecting an event occurred in the resources to display the detected event on the display apparatus, comprising: candidate event information storing means for storing therein information related to a candidate event which may occur in the resources; detecting means, provided with the resources, for detecting an event occurred in the resources; detected event display controlling means for displaying the detected event on the display apparatus; detected event selecting means for selecting the detected event displayed by the detected event display controlling means; selected event information storing means for storing therein information related to the selected event selected by the detected event selecting means; judging means for judging as to whether or not the event detected by the detecting means corresponds to the event selected by the detected event selecting means based on the information stored in the selected event information storing means; and detected/selected event display controlling means for displaying the detected event on the display apparatus based upon a judgment result by the judging means when the event detected by the detecting means corresponds to the event selected by the detected event selecting means.

According to a third aspect of the present invention, there is provided an information processing apparatus including a plurality of resources containing a display apparatus and for detecting an event occurred in the resources to display the detected event on the display apparatus, comprising: detecting means, provided with the resources, for detecting an event occurred in the resources; detected event display controlling means for displaying the detected event on the display apparatus; detected event selecting means for selecting the detected event displayed by the detected event display controlling means; candidate event information storing means for storing therein information related to a candidate event which may occur in the resources; candidate event display controlling means for displaying the candidate event on the display apparatus; candidate event selecting means for selecting the candidate event displayed by the candidate event display controlling means; selected event information storing means for storing therein information related to the event selected by either the candidate event selecting means or the detected event selecting means; judging means for judging as to whether or not the detected event corresponds to the selected event selected by either the candidate event selecting means, or the detected event selecting means based on the information. stored in the selected event information storing means; and detected/ selected event display controlling means for displaying the detected event on the display apparatus based upon a judgment result by the judging means when the event detected by the detecting means corresponds to the selected event selected by either the candidate event selecting means or the detected event selecting means.

According to a fourth aspect of the present invention, there is provided an information processing apparatus including a plurality of resources and for detecting an event occurred in the resources to notify the detected event, comprising: means for producing event data containing an identifier indicative of a sort of the detected event and also information specific to the detected event; means for receiving the produced event data to derive the information specific to the event from the event data; storing means for storing therein a basic message with respect to each sort of event; and means for receiving the produced event data to derive the basic message corresponding thereto from the storing means based on the identifier, and for inserting the information specific to the event into the basic message to thereby produce a complete message.

According to a fifth aspect of the present invention, there is provided a message forming apparatus used in an information processing apparatus including a plurality of resources and for detecting an event occurred in the resources to notify the detected event, comprising: storing means for storing therein a basic message with respect to each sort of event; means for receiving event data containing an identifier indicative of the sort of a detected event and information specific to the detected event, and for deriving the information specific to the event from the event data; and means for receiving the event data to derive the basic message corresponding thereto from the storing means based on the identifier, and for inserting the information specific to the event into the basic message to thereby produce a complete message.

According to a sixth aspect of the present invention, there is provided a message forming method used in an information processing apparatus including a plurality of resources and for detecting an event occurred in the resources to notify the detected event, comprising the steps of: storing a basic message with respect to each sort of event; receiving event data containing an identifier indicative of the sort of a detected event and information specific to the detected event; deriving the information specific to the event from the event data; receiving the event data to derive the basic message corresponding thereto from the storing means based on the identifier; and inserting the information specific to the event into the basic message to thereby produce a complete message.

BRIEF DESCRIPTION OF THE DRAWINGS

FIG. 4 is a view showing a display example of the normal events employed in the embodiment of FIG. 2;

FIG. 6 is a view showing a concrete example of the interest event data shown in FIG. 5;

FIG. 9 is a view explanatorily showing a display of the selected interest event used in the embodiment of FIG. 2;

FIG. 12 is a view schematically showing a concrete example of the message data of FIG. 11; and FIG. 13 is a flow chart for explaining operations of the message forming system shown in FIG. 10.

DETAILED DESCRIPTION OF THE PREFERRED EMBODIMENTS

Referring now to the accompanying drawings, an embodiment of the present invention will be described.

Figure 1:
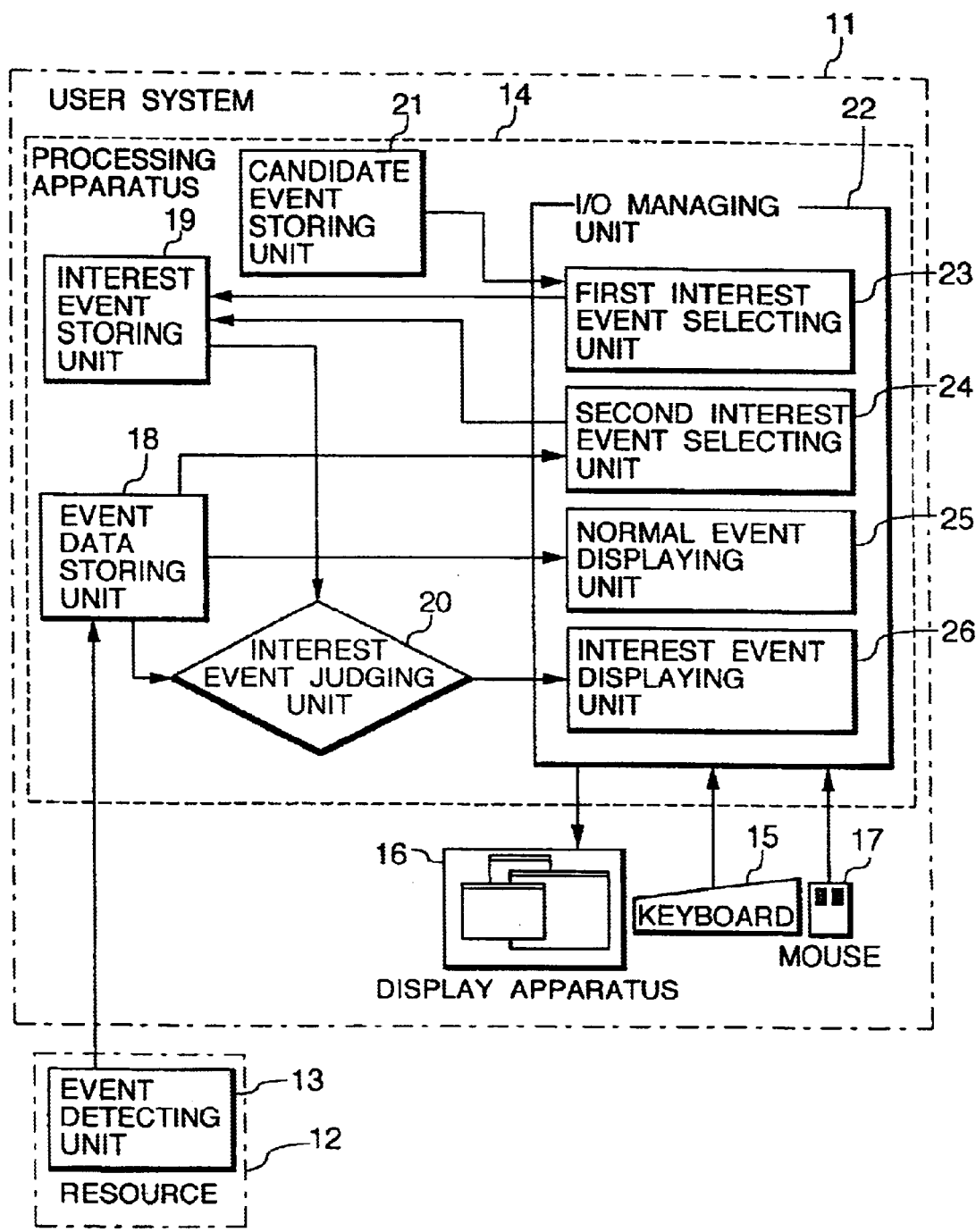
FIG. 1 is a schematic block diagram showing a basic structure of an information processing apparatus according to an embodiment of the present invention.

FIG. 1 simply illustrates an information processing system according to an embodiment of the present invention. In this drawing, a user system 11 is connected to a plurality of resources 12. The user system 11 may be connected via a network such as a local area network (LAN) to the resources 12, or may be directly connected via a specific cable to the resources 12. Each of the resources 12 may be realized by such a hardware as a computer system, a printer, and a scanner, or may be realized by a software executed on a hardware. The resource 12 owns an event detecting unit 13 for detecting an event occurred in the resource 12. When an event occurs, event data is sent from the event detecting unit 13 to the user system 11.

The user system 11 corresponds to, for example, either a personal computer, or a workstation, and is constructed of a processing apparatus 14, a keyboard 15, a display apparatus 16, a mouse 17 and so on. The, processing apparatus 14 performs various processes and also an event monitoring/displaying process. For the sake of convenience, the processing apparatus 14 may be equivalent to an event monitoring/displaying unit. The event monitoring/displaying unit which may be realized by the processing apparatus 14 in the software execution mode includes an event data storing unit 18, an interest event data storing unit 19, an interest event judging unit 20, a candidate event data storing unit 21, and an input/output. (I/O) managing unit 22. The input/output managing unit 22 includes a first interest event selecting unit 23, a second interest event selecting unit 24, a normal event displaying unit 25, and an interest event displaying unit 26.

The event detecting unit 13 employed in the resource 12 of the information processing system according to the embodiment detects the event occurred in the resource, and transfers the event data to the user system 11. In the user system 11, the event data storing unit 18 stores the event data, and the normal event displaying unit 25 displays the event data within a predetermined window of the display apparatus 16.

In the candidate event data storing unit 21, information on such an event which may probably occur in the resource 12 is stored. The first interest event selecting unit 23 displays to the user the candidate event (proposed event) defined by the data stored in the candidate event data storing unit 21, by which the user can select the event. The data related to the event selected by the user is stored in the interest event data storing unit 19. In the second interest event selecting unit 24, the user can select a predetermined event from the events displayed on the display apparatus 16 by the normal event displaying unit 25. Also the data related to the event selected at this time is stored in the interest event data storing unit 19.

The interest event judging unit 20 compares the event data notified from the event detecting unit 13 with the event data of the interest event data storing unit 19, and notifies the coincident information to the interest event displaying unit 26. The interest event displaying unit 26 displays this notified event in a window in front of the window for the above-described normal event of the display apparatus 16.

Figure 2:
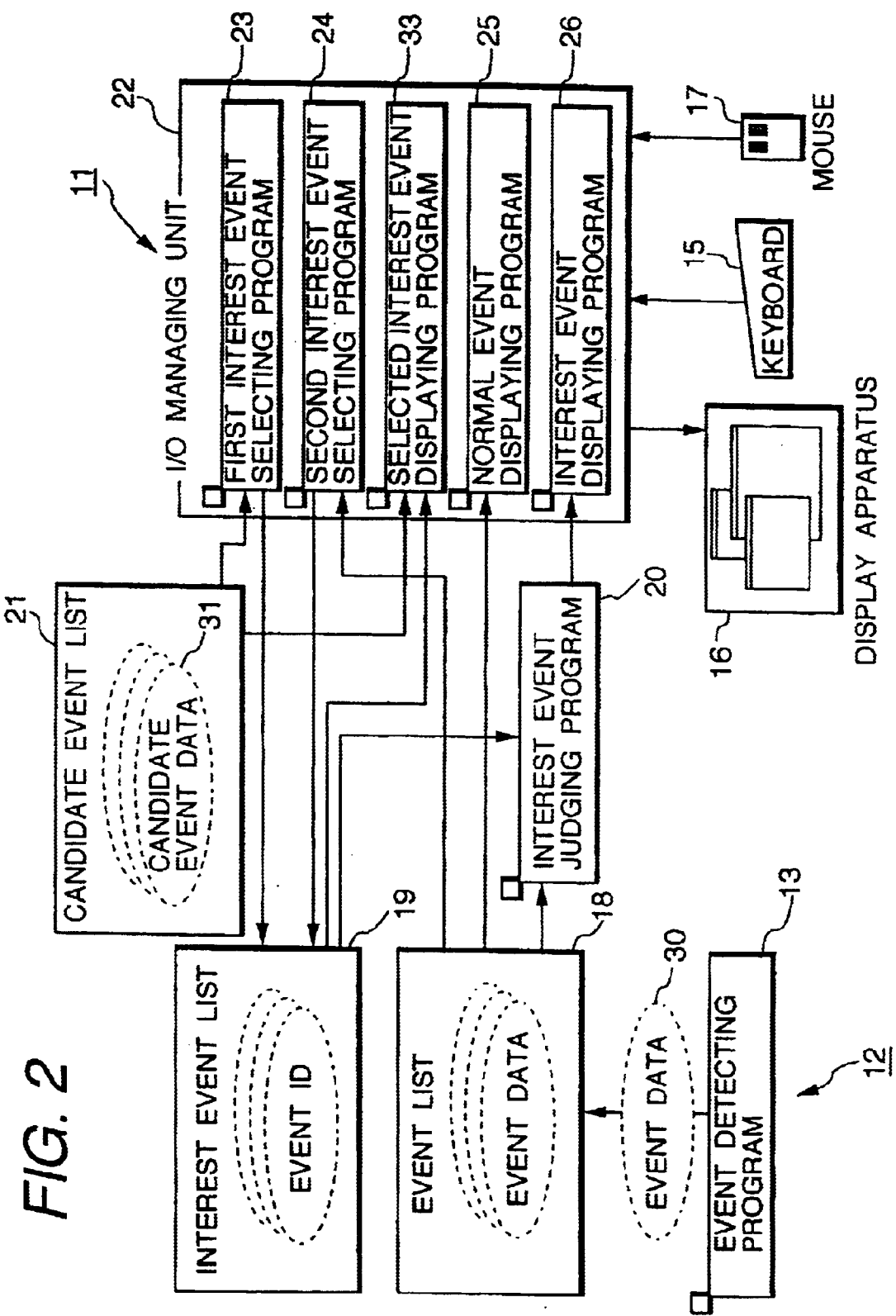
FIG. 2 is a schematic block diagram showing a detailed arrangement of the information processing apparatus according to the embodiment of the present invention.

FIG. 2 schematically represents a concrete example of the above-described information processing system according to the embodiment. In FIG. 2, the same reference numerals shown in FIG. 1 are employed as those for denoting the same or similar elements, and detailed descriptions thereof are omitted. In FIG. 2, an event detecting program 13 of the resource 12 detects an event occurred in the resource 12, stores event data 30 into an event list 18, and transfers the stored event data to an interest event judging program 20 and a normal event displaying program 25.

Figure 3:
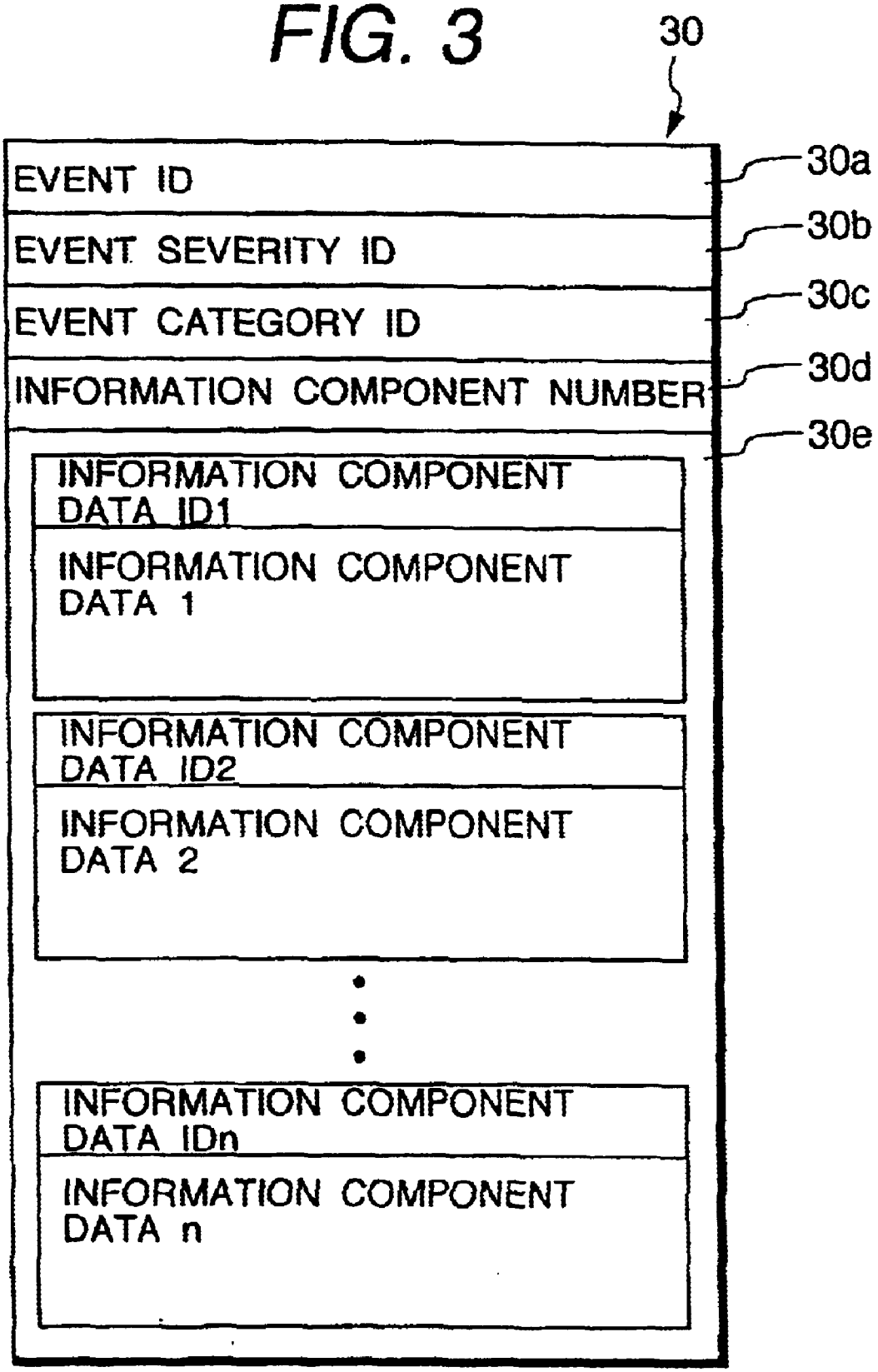
FIG. 3 is a view showing a format of event data used in the information processing apparatus of FIG. 2.

As indicated in FIG. 3, the event data 30 contains an event ID 30a functioning as an identifier for exclusively indicating a sort of notified information, an event severity ID 30b functioning as an identifier indicative of a severity of notified information, and an event category ID 30c functioning as an identifier representative of which information the notified information is related to. As an event, a description will now be made of, e.g., a failure. That is, actual failure information is constructed of a plurality of pieces of dynamic component information for indicating such items, for instance, in which apparatus a failure occurred, which sort of failure occurred, and when a failure occurred. In this embodiment, both of an information component data list 30e and information component number data 30d indicative of the number of components contained in this information component data list 30e are contained in the event data 30. The information component data list 30e is constituted by a pair of information component data ID functioning as an identifier for representing these components, and information component data corresponding to the actual dynamic component data.

When a predetermined service is requested to the resource 12, for instance, but a supply of this service is stopped on the side of the resource 12, such an event message as "Supply of service A is stopped due to reason B" is notified to the user system 11. In this case, assuming now that and "B" are variables, such an event message as "Supply of service A is stopped due to reason B" indicates a sort of event that a predetermined service supply is stopped due to a certain reason. This implies that the event may occur in any place, any type of service may be provided, and any reason may be accepted. This sort of event is specified by the event ID 30a. Then, the component ID corresponds to "service" and "reason", and the component data corresponds to the concrete values of A and B. Based upon such information, a concrete message "Supply of service A is stopped due to reason B" produced.

A detailed description how to produce a message will be made later with reference to the drawings subsequent to FIG. 10.

The normal event displaying program 25 displays the event notified from the event detecting program 13 in a list form in a normal event displaying window of the display apparatus 16 by using the event data. An example of this display is shown in FIG. 4. It should be noted that the normal event displaying program 25 causes all of the notified events to be displayed in response to the display mode, or causes only the event selected in accordance with a preset condition to be displayed.

Figure 5:
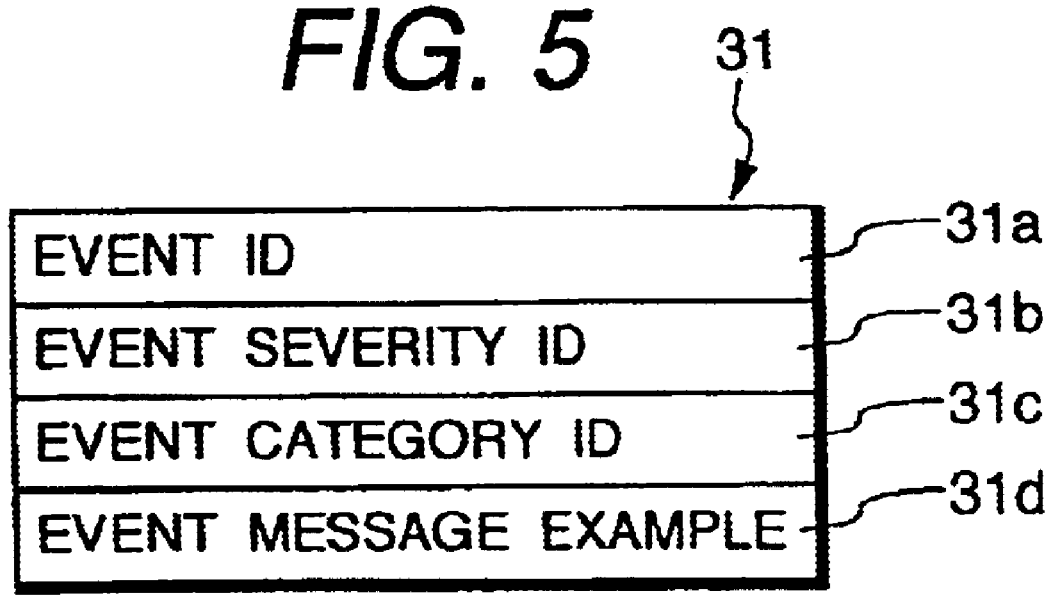
FIG. 5 is a view showing a format of interest event data employed in the embodiment of FIG. 2.

The candidate event list 21 stores therein all of candidate events (proposed events) as a list of the candidate event data 31, which may be produced in the information processing system according to the embodiment. As indicated in FIG. 5, the candidate event data 31 contains an event ID 31a functioning as an identifier for exclusively indicating a sort of notified information, an event severity ID 31b functioning as an identifier indicative of a severity of notified information, an event category ID 31c functioning as an identifier representative of which information the notified information is related to, and a display event message example 31d corresponding to the event ID 31a. The event message example is, for instance, such a message "Supply of service A is stopped due to reason B". It should be noted that symbols A and B correspond to variables. In FIG. 6, there is shown an example of the candidate event list 21. In this example, seven sorts of candidate events (proposed events) are indicated.

Figure 7:
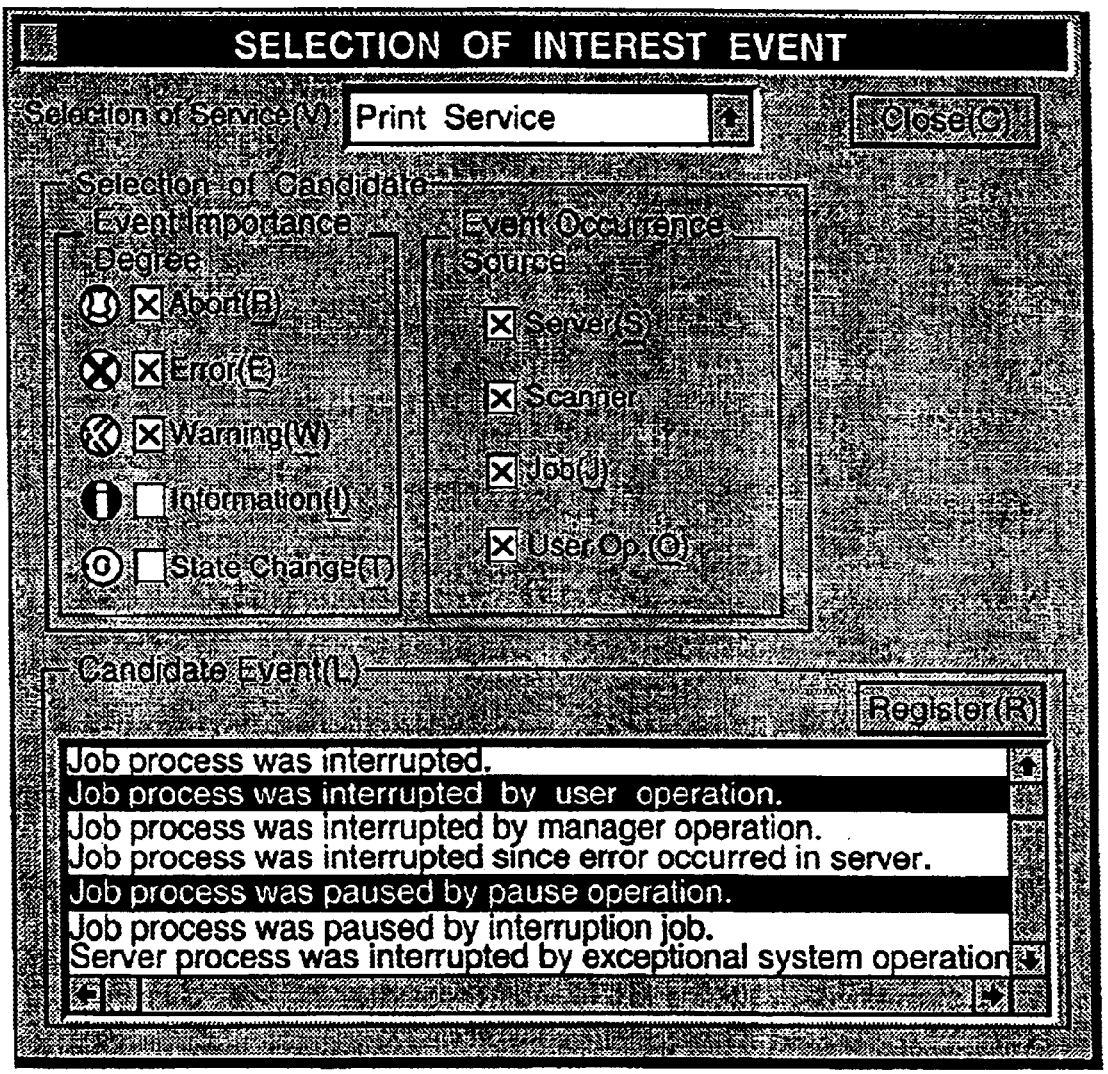
FIG. 7 is a view explanatorily showing a selection of the interest event based on the event subjects used in the embodiment of FIG. 2.

The first interest event selecting program 23 of the input/output managing unit 22 is executed in response to an operation instruction issued from a user who manipulates either the keyboard 15 or the mouse 17, and thus, the candidate events contained in the candidate event list 21 are displayed in a list form within the window of the display apparatus 16. The user selects and instructs a desired interest event as an interest event from the candidate events displayed in the list by using the mouse 17 or the keyboard 15. When this list is displayed, for example, as, shown in FIG. 7, either the severity or the category of the candidate event is selected, so that only the candidate events belonging to the same severity or the same category may be indicated. Alternatively, all of the candidate events may be displayed. In the example of FIG. 7, "abort", "error" and "warning" are selected from the severity, and all of "server", "scanner", "job" and "user operation" are selected as an event occurrence source. This selection may be performed by a click process of the corresponding button with employment of the mouse 17. In accordance with this click process, a mark "x" is displayed within the button. The message samples of the candidate event are displayed every line within the window of FIG. 7. The relevant line is click-processed by way of the mouse 17 to select the corresponding candidate event. Thereafter, when the register button is click-processed, the register operation is ended. Thus, when the candidate event is registered, the candidate event ID of the candidate event is stored in the interest event list 19. In this manner, sorts of desirable events are registered.

In response to an operation instruction issued from the user by using the keyboard 15 or the mouse 17, the second interest event selecting program 24 is executed. The user selects and instructs such an event to be displayed as an interest event from the events displayed in the list form in the normal events display window of the display apparatus 16 in accordance with the normal event displaying program 25. Under control of the second event selecting program 24, the event ID of the event selected with reference to the event list 18 is stored in the interest event list 19. Into the interest event list 19, the event IDs of the events which have been selected in this manner by utilizing the first interest event selecting program 23 and the second interest event selecting program 24 are stored as a list. It should be understood that since the registered item is the event ID, the concrete events under display are not registered, but the sort of a preselected event containing such a concrete event is registered. As a consequence, such an event similar to the concrete event under display is also handled as the interest event.

Figure 8:
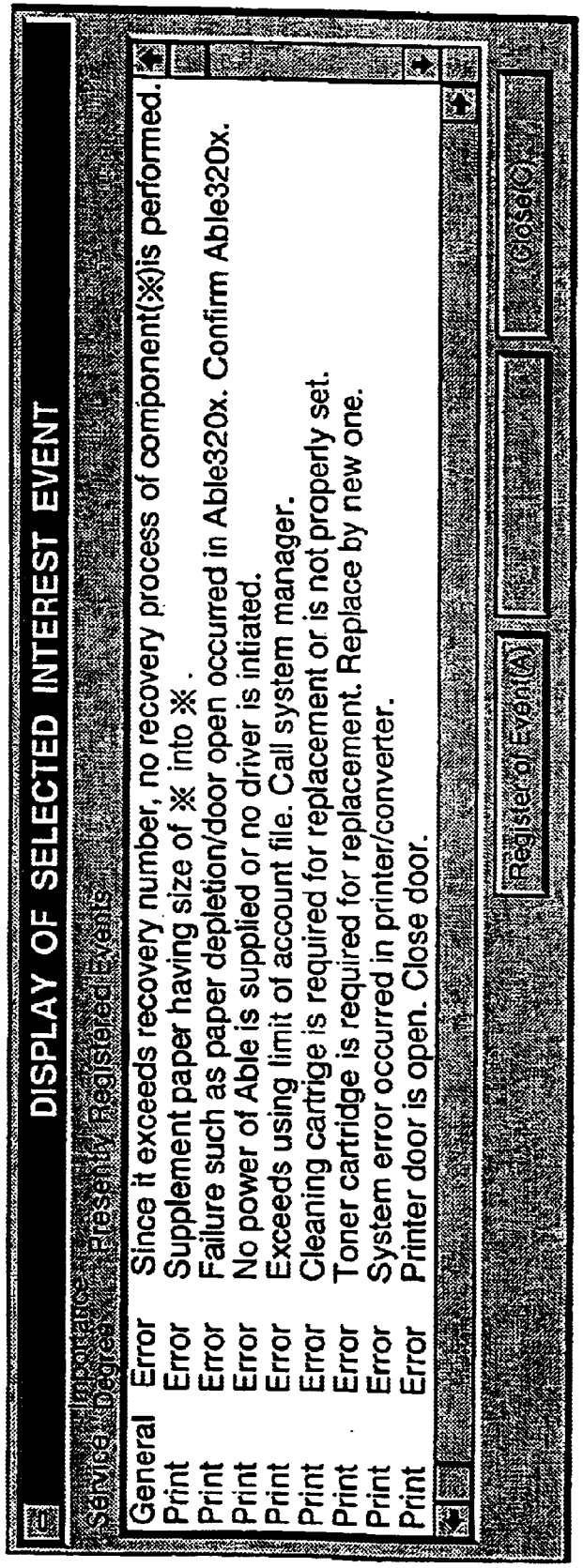
FIG. 8 is a view explanatorily showing a notification of the interest events used in the embodiment of FIG. 2.

The selected interest event displaying program 33 is executed in response to an operation instruction issued from the user by employing the keyboard 15 or the mouse 17. Under control of the displaying program 33, all of the events ID 32 registered in the interest event list 19 are compared with the event ID 31a of the candidate event data 31 stored in the candidate event list 21, and the candidate event coincident therewith is displayed in a list with employment of the event data 31 of the candidate event list. This display example is indicated in FIG. 8.

The interest event judging program 20 sequentially compares the event ID of the event notified from the event detecting program 13 with all of the events ID stored in the interest event list 19, and notifies the coincident event ID to the interest event displaying program 26 when the coincidence is established. The interest event displaying program 26 produces another window for displaying an interest event, different from the window produced by the normal event displaying program 25, and displays the event notified from the interest event judging program 20. This interest event displaying window is arranged at the frontmost screen in order that the user can easily recognize the occurrence of the interest event. It should also be noted that when the interest event judging program 20 notifies another interest event while displaying one interest event, the former interest event is displayed in a list form on the same interest event displaying window, so as to avoid a cumbersome window display by forming a new window. Such a list example is indicated in FIG. 9.

It should also be noted that although the interest events have been registered with respect to the sorts of events in the above-explained embodiment, the interest events may be registered with respect to the contents of the concrete events.

Next, a message production Will be explained.

Figure 10:
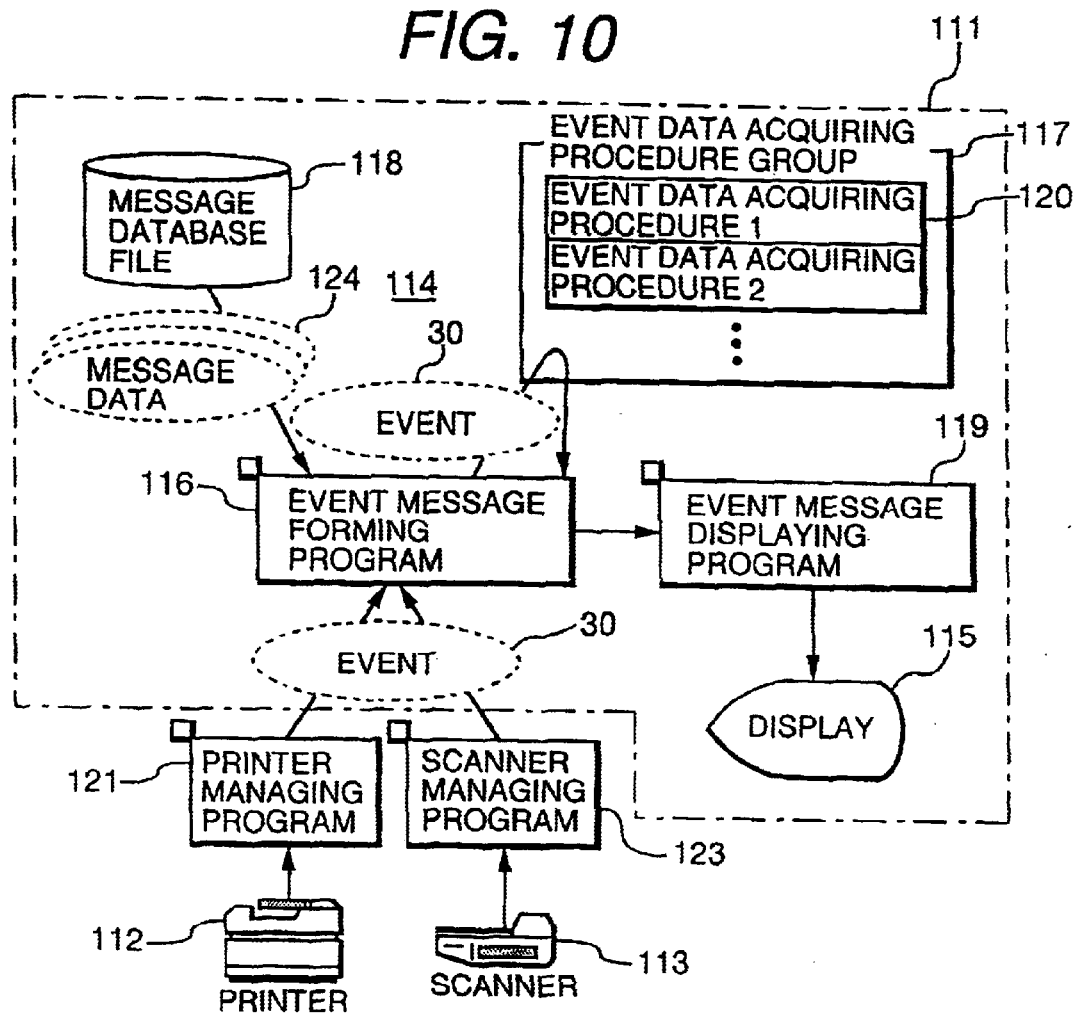
FIG. 10 is a schematic block diagram showing an arrangement of a message forming system according to another embodiment of the present invention.

FIG. 10 schematically shows an information processing apparatus containing a message producing mechanism. In this drawing, a user system 111 (corresponding to reference numeral 11 of FIG. 1) is connected via either a network such as a LAN, or an individual cable to resources such as a printer 112 and a scanner 113. The user system 111 is, for instance, a personal computer or a workstation, and contains various input/output apparatuses such as a processing apparatus 114 and a display apparatus 115. In the user system 111, an event message forming/displaying unit realized in a software execution includes an event message forming program 116, an event data acquiring procedure group 117, a message database file 118, and an event message displaying program 119, as represented in the respective blocks. The event data acquiring procedure group 117 is constructed of a plurality of event data acquiring procedures 120.

The printer 112 contains a printer managing program 121. This printer managing program 121 detects such an event as a failure occurred in the printer 112, and the detected event is notified to the user system 111 by employing the event data 30. The event data 30 has been already described with reference to FIG. 3 similarly, the scanner 113 owns a scanner managing program 123. This scanner managing program 123 detects an event of the scanner 113, and notifies the detected event to the user system 111 with using the event data 30. Other resources own similar event detecting/notifying functions. It should be noted that the resources may be realized by a hardware, or a software.

Figure 11:
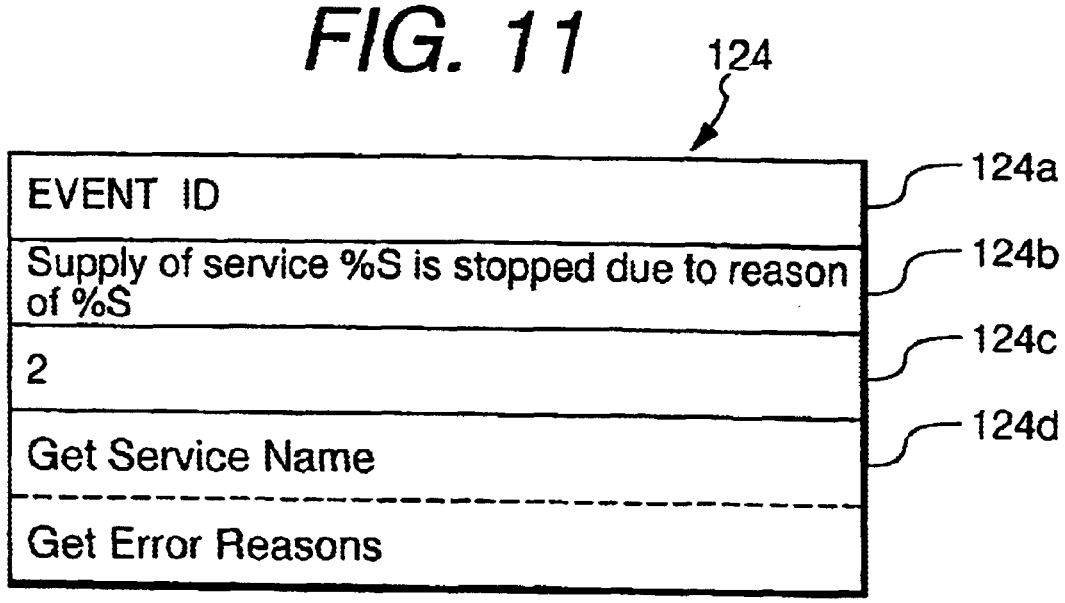
FIG. 11 is a view showing a format of message data stored in a message database file employed in the message forming system of FIG. 10.

The message database file 118 holds message data 124, depending on the sort of event. As shown in FIG. 11, the message data 124 contains an event ID 124a functioning as an identifier for indicating the sort of event, a basic message character string 124b, a list 124d of procedures for fetching a message component from the event data 30, and an indication 124c for the number of procedure designated by the list 124d. The basic message character string 124b corresponds to static message component common to the relevant sort of event, and a variable "%S" is positioned at portions different from each other in the respective events. When a dynamic message component different from each other in the respective events is inserted into the variable portions, a complete message may be produced.

In the example shown in FIG. 11, the message data 124 is indicated which relates to the sort of event, i.e., "Supply of a certain service is stopped due to some reason in any of resources". Then, the basic message character sting such as "Supply of service %S is stopped due to reason of %S" contains the two variables. Two message components are inserted into the variable portions. The message components are derived from the event data by an event data acquiring procedure specified by identifiers "GetserviceName" and "GetErrorReason".

FIG. 12 shows a more concrete example of the message data 124. In FIG. 12, there is indicated seven sorts of message data 124, and the first message data corresponds to such an event when printer paper was depleted in the printer. The event ID 124a corresponds to an alphabetical character string starting with "id". The basic message characteristic string 124b implies "Paper of %S was depleted". The procedure number display 124c is "1", and the event data acquiring procedure list 124d for fetching the message component from the event data 30 is indicated by an alphabet character string starting with "PS". Other message data examples are similarly described, and therefore no explanations thereof are made FIG. 13 indicates a process to form a message. In this drawing, the event message forming program 116 judges whether or not the event from the resource such as the printer 112 is notified by the event data 30 (step 511). Upon receipt of the event data 30, the event message forming program 1136 retrieves the message database file 118 by using the event ID 124a to derive the corresponding message data 124 (steps S12 and 513). subsequently, the event message forming program 116 initializes the sequence "P" of the position into which the information component (dynamic message component) is inserted (namely sequence of event data acquiring procedures in the message data 124) to 1, and the number "N" of unexecuted event data acquiring procedures (number of uninserted dynamic message components) is initialized by the procedure number display 124c of the message data 124 (step S14).

Thereafter, a check is done as to whether or not there is an unexecuted event data acquiring procedure 120 (namely whether or not an uninserted dynamic message component is present). If YES, then the event data 30 is transferred to the P-th event data acquiring procedure 120 registered in the message data 124, 50 that a character string of a message component corresponding to this event data acquiring procedure 120 is derived (steps S15 and S16). The event message forming program 116 substitutes the derived character string for the P-th variable of the basic message character string 124b (step S17). Thereafter, P is incremented by 1 and N is decremented by 1 (step S18) subsequently, a similar process operation is repeated until N becomes zero. When N becomes zero, the complete message is supplied to the event message displaying program 119, and the message is displayed on the display apparatus 115 under control of the event message displaying program 119.

The event message forming method of this information processing apparatus can be applied to the formation of new sorts of event messages by adding the message data 124. In response to the new sorts of events, the managing program employed in the resource produces the corresponding event data 30. On the other hand, the message data 124 corresponding to the new sorts of events is additionally provided in the message database file 118. If a new event data acquiring procedure 120 is further, newly required, then such a new event data acquiring procedure may be prepared. In such a structure, the new sorts of messages can be accepted without changing the basic idea of message forming/displaying method.

As previously explained, according to the present invention, the event desired to be truly monitored by the user can be designated, so that operability of the information processing system can be improved. As to the candidate event selection based on the list, such a scheme selection can be systematically achieved. In this case, the class of the candidate event can be especially designated. Also, in the selection based on the list of the detected event, such a selection properly adapted to the actual environment can be made, so that an important event which has been mistakenly checked in the list of candidate events can be covered.

Based on the identifier indicative of the event sort contained in the event data, the corresponding basic data is derived from the storing unit, and further the information specific to the event is derived, and then this specific information is inserted into the basic message to thereby form a complete message. As a consequence, the basic messages can be commonly used in the most messages. Also, the procedure to derive the information specific to the event can be commonly used in the most messages. Accordingly, the messages can be formed by a simply constructed arrangement. A newly formed event may be processed with higher flexibility by adding a basic message and the like.

What is claimed:

1. An information processing apparatus including a plurality of resources and for detecting an event occurring in the resources to notify the detected event, means for producing event data containing an identifier indicative of a sort of the detected event and also information specific to said detected event;

means for receiving the produced event data to derive the information specific to the event from the event data;

storing means for storing therein a basic message with respect to each sort of event, the basic message including a static message, to which a description indicating an insertion portion of information specific to the event, such as a service name or an error name or a component data, is inserted and which is commonly used for each sort of events; and means for receiving the produced event data to derive the basic message corresponding thereto from said storing means based on the identifier, and for inserting the information specific to the event into the description of the basic message to thereby produce a complete message.

2. The information processing apparatus as claimed in claim 1, wherein the information specific to the event of the event data contains one or more component data pieces to be inserted into the basic message and a display of the number of the component data pieces.

3. The information processing apparatus as claimed in claim 2, wherein said means for deriving the information specific to the event executes a procedure for deriving the component data from the event data by times corresponding to the number of the component data pieces.

4. A message forming appraised in an information processing apparatus including a plurality of resources and for detecting an event occurring in the resources to notify the detected event, comprising:

storing means for storing therein a basic message with respect to each sort of event, the basic message including a static message, to which a description indicating an insertion portion of information specific to the event such as a service name or an error name or a component data, is inserted in which is commonly used for each sort of event; means for receiving event data containing an identifier indicative of the sort of the detected event and information specific to the detected event, and for deriving the information specific to the event from the event data; and means for receiving the event data to derive the basic message corresponding thereto from said storing means based on the identifier, and for inserting the information specific to the event into the description of the basic message to thereby produce a complete message.

5. A message forming method used in an information processing apparatus including a plurality of resources and for detecting an event occurring in the resources to notify the detected event, comprising:

storing a basic message with respect to each sort of event, wherein the basic message includes a static message, to which a description indicating an insertion portion of information specific to the event, such as a service name or an error name or a component data, is inserted and which is commonly used for each sort of event;

receiving event data containing an identifier indicative of the sort of a detected event and information specific to the detected event;

deriving the information specific to the event from the event data;

receiving the event data to derive the basic message corresponding thereto from said storing means based on the identifier; and inserting the information specific to the event into the description of the basic message to thereby produce a complete message.

* * * * *

UNITED STATES PATENT AND TRADEMARK OFFICE
CERTIFICATE OF CORRECTION

PATENT NO.    : 6,681,245 B1
DATED         : January 20, 2004
INVENTOR(S)   : Shigekazu Sasagawa It is certified that error appears in the above-identified patent and that said Letters Patent is hereby corrected as shown below:

Column 9,
Line 41, after "detected event," insert -- comprising: --.

Signed and Sealed this

Seventeenth Day of August, 2004

JON W. DUDAS
*Acting Director of the United States Patent and Trademark Office*